United States Patent
Doi et al.

(10) Patent No.: US 6,584,240 B2
(45) Date of Patent: Jun. 24, 2003

(54) OPTICAL MODULATOR HAVING RIDGE AND ASSOCIATED STRUCTURE ON SUBSTRATE

(75) Inventors: Masaharu Doi, Kawasaki (JP); Shinji Taniguchi, Kawasaki (JP); Masaaki Ohyama, Kawasaki (JP); Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/820,634

(22) Filed: Mar. 30, 2001

(65) Prior Publication Data

US 2002/0141679 A1 Oct. 3, 2002

(51) Int. Cl.$^7$ ............................................. G02F 1/035
(52) U.S. Cl. ..................... 385/2; 385/3; 385/8; 385/9
(58) Field of Search ............................. 385/2, 3, 8, 9, 385/14, 16, 131; 372/46, 50

(56) References Cited

U.S. PATENT DOCUMENTS

| 5,259,044 A | * | 11/1993 | Isono et al. | ............ | 385/2 |
| 5,790,719 A | * | 8/1998 | Mitomi et al. | ............ | 385/2 |
| 6,038,354 A | * | 3/2000 | Sato et al. | ............ | 385/2 |

FOREIGN PATENT DOCUMENTS

| JP | 3-229214 | 10/1991 |
| JP | 4-288518 | 10/1992 |

OTHER PUBLICATIONS

Kulick, J., "Road to 40–Gbit/sec lightwave systems," Lightwave Magazine, Mar. 2001 (actual publication date Mar. 18, 2001).

Doi, M., et al., "Clock Modulator Integrated LiNbO$_3$ RZ Modulator," Proceedings of the 2000 IEICE General Conference, C–3–23, p. 202, Mar. 7, 2000 (full English translation).

Doi, M., et al., "40Gb/s LiNbO$_3$ Modulator," Technical Report of IEICE, vol. 100, No. 234, pp. 43–48, Jul. 28, 2000 (full English translation).

* cited by examiner

Primary Examiner—Phan T. H. Palmer
(74) Attorney, Agent, or Firm—Staas & Halsey LLP

(57) ABSTRACT

The invention provides an optical modulator which suppresses the loss of a microwave which advances through an electrode and of light which propagates in a waveguide and makes the losses in individual arm waveguides substantially equal to each other to suppress the deterioration of the extinction coefficient to improve the transmission quality. The optical modulator includes a substrate having an electro-optical effect and having a ridge, first and second grooves and first and second banks formed thereon, a Mach-Zehnder optical waveguide, an electrode, and first and second recesses formed at symmetrical positions with respect to the ridge on the first and second banks, respectively. The optical modulator is applied, for example, to a transmission side apparatus for a long distance optical transmission system.

43 Claims, 9 Drawing Sheets

Rw = 9.5  We = 5   Se = 31  d = 0.6
Gw$_2$ = 5  W$_{10}$ = 25  S$_2$ = 50  d$_2$ = 0.05
Gh = 6   h$_1$ = 32
         h$_2$ = 32
         hw = 4                UNIT: μm

UNIT: μm

UNIT: μm

OPTICAL MODULATOR HAVING RIDGE AND ASSOCIATED STRUCTURE ON SUBSTRATE

BACKGROUND OF THE INVENTION

1) Field of the Invention

This invention relates to an optical modulator suitable for use in the field of long distance optical communication systems.

2) Description of the Related Art

As the data transmission rate increases in recent years, optical modulators for modulating a data signal from an electric signal into an optical signal are developed energetically in the field of long distance communication systems for communication such as submarine optical communication.

Figure 8:
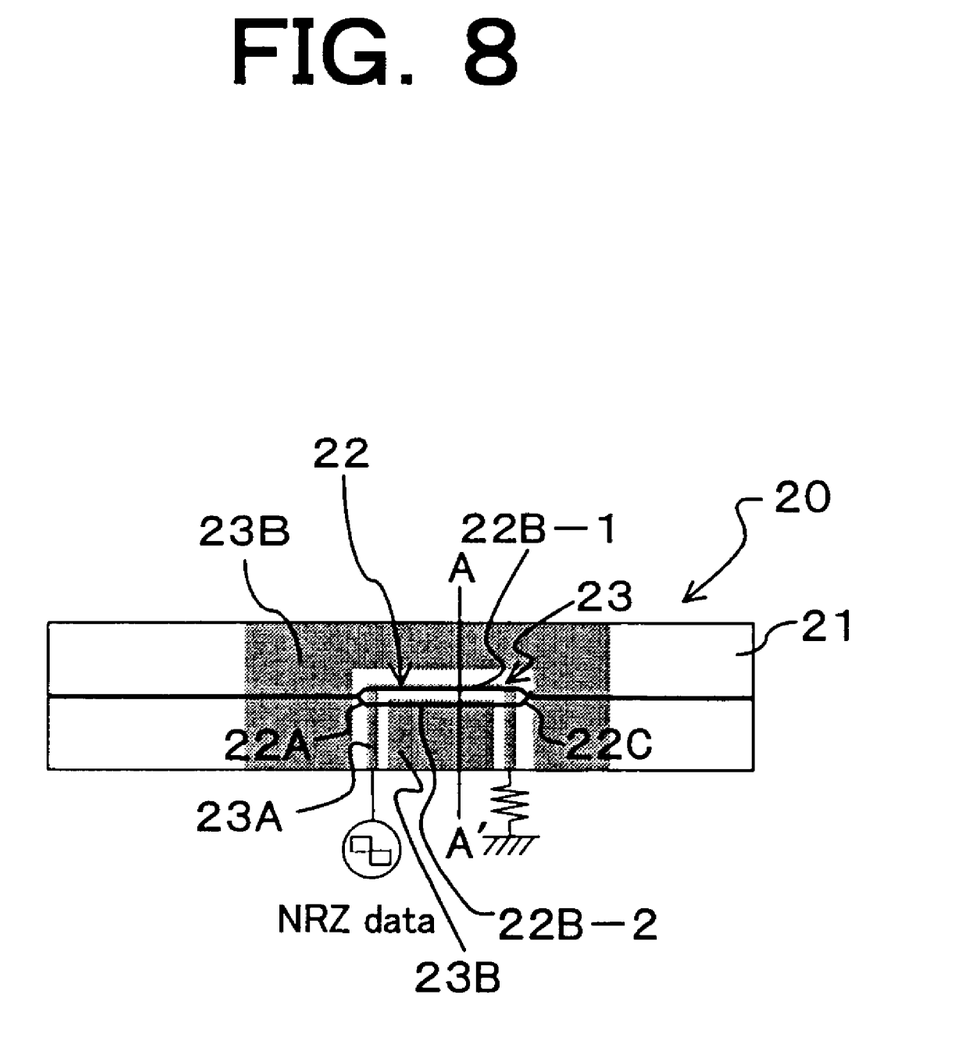
FIG. 8 is a schematic view showing a single drive optical modulator.

One of such optical modulators as just described is, for example, such a single drive optical modulator 20 as shown in FIG. 8. Referring to FIG. 8, the single drive optical modulator 20 shown includes a substrate 21 on which a Mach-Zehnder optical waveguide 22 is formed, and an electrode 23 formed integrally on the substrate 21 and including a single signal electrode 23A and a grounding electrode 23B.

Figure 9:
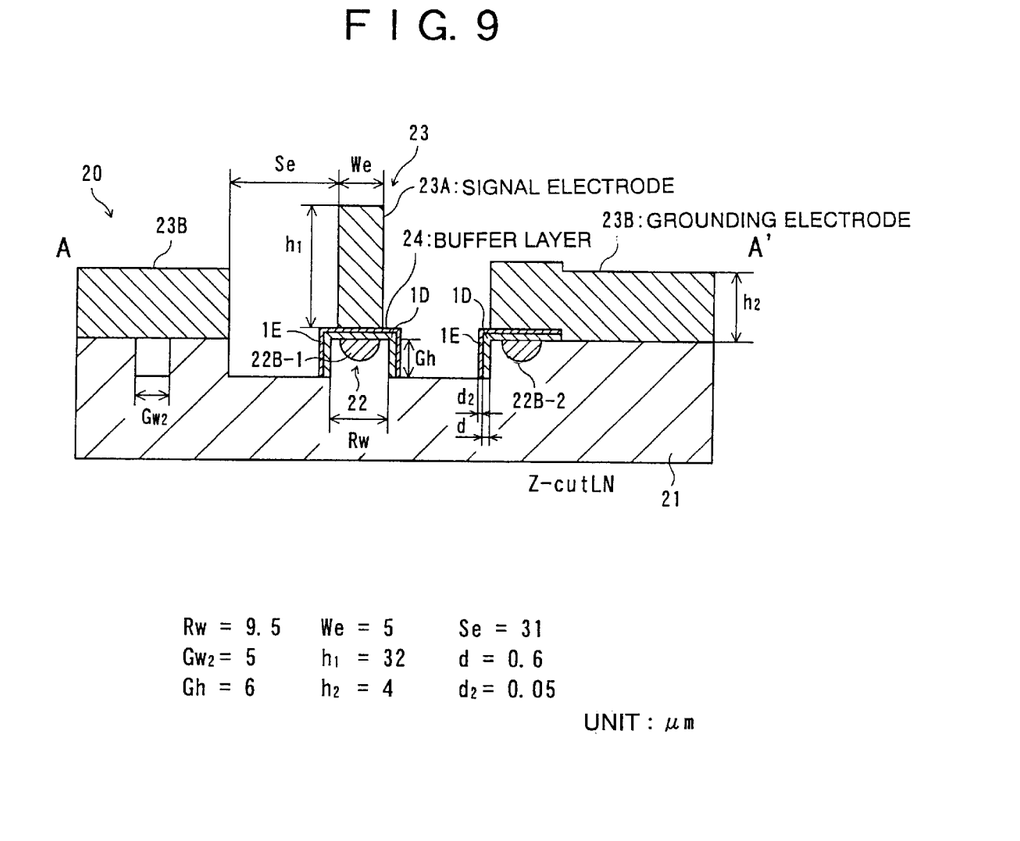
FIG. 9 is a sectional view taken along line A–A' of the optical modulator shown in FIG. 8.

FIG. 9 is a sectional view taken along line A–A' of the single electrode optical modulator 20 shown in FIG. 8. As seen in FIG. 9, the single electrode optical modulator 20 is configured such that the electrode 23 is formed on the substrate 21, which is made of, for example, lithium niobate (LiNbO$_3$) and cut (Z-axis cut) in the Z-axis direction of the crystal orientation, together with the Mach-Zehnder optical waveguide 22.

The Mach-Zehnder optical waveguide 22 is formed by thermal diffusion of titanium (Ti) or a like substance on the substrate 21 and includes a Y branching waveguide 22A and two straight arm waveguides 22B-1 and 22B-2 on the light incoming side and a Y branching waveguide 22C on the light outgoing side. The electrode 23 includes the single signal electrode 23A and the grounding electrode 23B and converts, when a voltage signal (microwave) of, for example, NRZ (Non Return to Zero) data or the like is applied to the signal electrode 23A, the voltage signal into an NRZ optical signal.

As shown in FIG. 8, the single signal electrode 23A is formed so as to establish electric connection between two connector contacts on a one-side edge portion of the substrate 21 in its widthwise direction, and is formed such that part of it extends along and above the portion at which the straight arm waveguide 22B-1 is formed. Further, the grounding electrode 23B is formed such that it is disposed on the opposite sides of the single signal electrode in a spaced relationship by a predetermined distance thereby to form a coplanar line on the substrate 21.

When light from a light source not shown is introduced into the single electrode optical modulator 20 having the configuration described above with reference to FIGS. 8 and 9, while the light propagates in the Mach-Zehnder optical waveguide 22, it is modulated into an NRZ optical signal by the signal electrode 23A to which a voltage signal (microwave) of NRZ data or the like is applied. The modulated NRZ optical signal goes out of the single electrode optical modulator 20.

Where such a single electrode optical modulator 20 as described above is used to modulate a voltage signal into a data optical signal of a transmission rate particularly of 10 Gb/s or more, preferably of approximately 40 Gb/s, it is a significant subject for improvement of the transmission quality to suppress the loss of a microwave which advances through the electrode and suppress the deterioration of the extinction ratio.

SUMMARY OF THE INVENTION

It is an object of the present invention to provide an optical modulator which suppresses the loss of a microwave which advances through an electrode and loss of light which propagates in a waveguide and makes the losses in individual arm waveguides substantially equal to each other to suppress the deterioration of the extinction ratio to improve the transmission quality.

In order to attain the object described above, according to an aspect of the present invention, there is provided an optical modulator, comprising a substrate having an electro-optical effect and having formed thereon a ridge, first and second grooves which are positioned on the opposite sides of the ridge, and first and second banks which are positioned on the outer sides of the first and second grooves, respectively, a Mach-Zehnder optical waveguide formed on the substrate and including a first Y branching waveguide, first and second arm waveguides which are branched from the first Y branching waveguide and one of which is included in the ridge, and a second Y branching waveguide at which the first and second arm waveguides join together, an electrode formed on the substrate and including a signal electrode formed on the ridge and a grounding electrode formed on the first and second banks for controlling light propagating in the optical waveguide, and first and second recesses formed at symmetrical positions with respect to the ridge on the first and second banks, respectively.

With the optical modulator, since the first and second recesses are formed at the symmetrical positions with respect to the ridge 14a on the first and second banks, respectively, also the electric field distribution in the substrate by an electric signal provided to the signal electrode can be made symmetrical with respect to the ridge. Consequently, the optical modulator is advantageous in that the loss of a microwave which advances through the signal electrode can be suppressed.

Preferably, the substrate is made of LiNbO$_3$, and more preferably, the substrate made of LiNbO$_3$ is a Z-axis cut substrate.

The optical modulator may be configured such that the grounding electrode is provided on the first and second recesses and an air gap is formed in each of the first and second recesses or part of the grounding electrode is filled in the first and second recesses.

Preferably, the ridge and the first and second banks have top faces which are set in a substantially same level with one another, and more preferably, the first and second recesses have a depth set substantially equal to the depth of the first and second grooves.

Preferably, the signal electrode contacts with the ridge with a width smaller than the width of the ridge.

Preferably, a buffer layer is formed between the substrate and the electrode, and more preferably, the buffer layer is provided also in the first and second recesses.

Preferably, a silicon layer is placed on the substrate, and more preferably, the buffer layer is provided also in the first and second recesses.

The optical modulator is advantageous in that the absorption loss of light which propagates in the optical waveguide can be suppressed by the buffer layer and electric charge generated by a pyroelectric effect can be made uniform by the silicon layer to suppress the variation of the operating point by a temperature variation.

Further, since the buffer layer or the silicon layer is formed also in the first and second recesses 13-1, 13-2, the optical modulator is advantageous also in that adjustment of the characteristic impedance, which should be kept to a fixed value set in advance, and the speed matching between a microwave and light can be performed readily by setting of the thickness of the buffer layer or the silicon layer.

Preferably, one of the first and second arm waveguides is provided at a location of the other one of the first and second banks nearer to the ridge than a corresponding one of the first and second recesses.

With the optical modulator, since the one arm waveguide is provided nearer to the ridge than the other recess, the structure of the substrate portion at which the arm waveguide which is not included in the ridge is formed can be formed substantially same as the structure of the ridge. Therefore, the optical modulator is advantageous in that the losses of the arm waveguides can be made substantially equal to each other to suppress the deterioration of the extinction ratio.

According to another aspect of the present invention, there is provided an optical modulator, comprising a Z-axis cut substrate made of $LiNbO_3$ and having formed thereon a ridge, first and second grooves which are positioned on the opposite sides of the ridge, and first and second banks which are positioned on the outer sides of the first and second grooves, respectively, a Mach-Zehnder optical waveguide formed on the substrate and including a first Y branching waveguide, first and second arm waveguides which are branched from the first Y branching waveguide and one of which is included in the ridge, and a second Y branching waveguide at which the first and second arm waveguides join together, an electrode formed on the substrate and including a signal electrode formed on the ridge and a grounding electrode formed on the first and second banks for controlling light propagating in the optical waveguide, a buffer layer formed between the substrate and the electrode, a silicon layer placed on the substrate, and first and second recesses formed at symmetrical positions with respect to the ridge on the first and second banks, respectively.

With the optical modulator, since the first and second recesses are formed at the symmetrical positions with respect to the ridge 14a on the first and second banks, respectively, also the electric field distribution in the substrate by an electric signal provided to the signal electrode can be made symmetrical with respect to the ridge. Consequently, the optical modulator is advantageous in that the loss of a microwave which advances through the signal electrode can be suppressed.

Preferably, the buffer layer or the silicon layer is provided also in the first and second recesses. In this instance, the optical modulator is advantageous also in that adjustment of the characteristic impedance, which should be kept to a fixed value set in advance, and the velocity match between a microwave and light can be performed readily by setting of the thickness of the buffer layer or the silicon layer.

Preferably, one of the first and second arm waveguides is provided at a location of the other one of the first and second banks nearer to the ridge than a corresponding one of the first and second recesses. In this instance, the structure of the substrate portion at which the arm waveguide which is not included in the ridge is formed can be formed substantially same as the structure of the ridge. Therefore, the optical modulator is advantageous in that the losses of the arm waveguides can be made substantially equal to each other to suppress the deterioration of the extinction ratio.

The above and other objects, features and advantages of the present invention will become apparent from the following description and the appended claims, taken in conjunction with the accompanying drawings.

DESCRIPTION OF THE PREFERRED EMBODIMENTS

The embodiments of the present invention will be explained referring to the accompanying drawings.

a. First Embodiment

Figure 2:
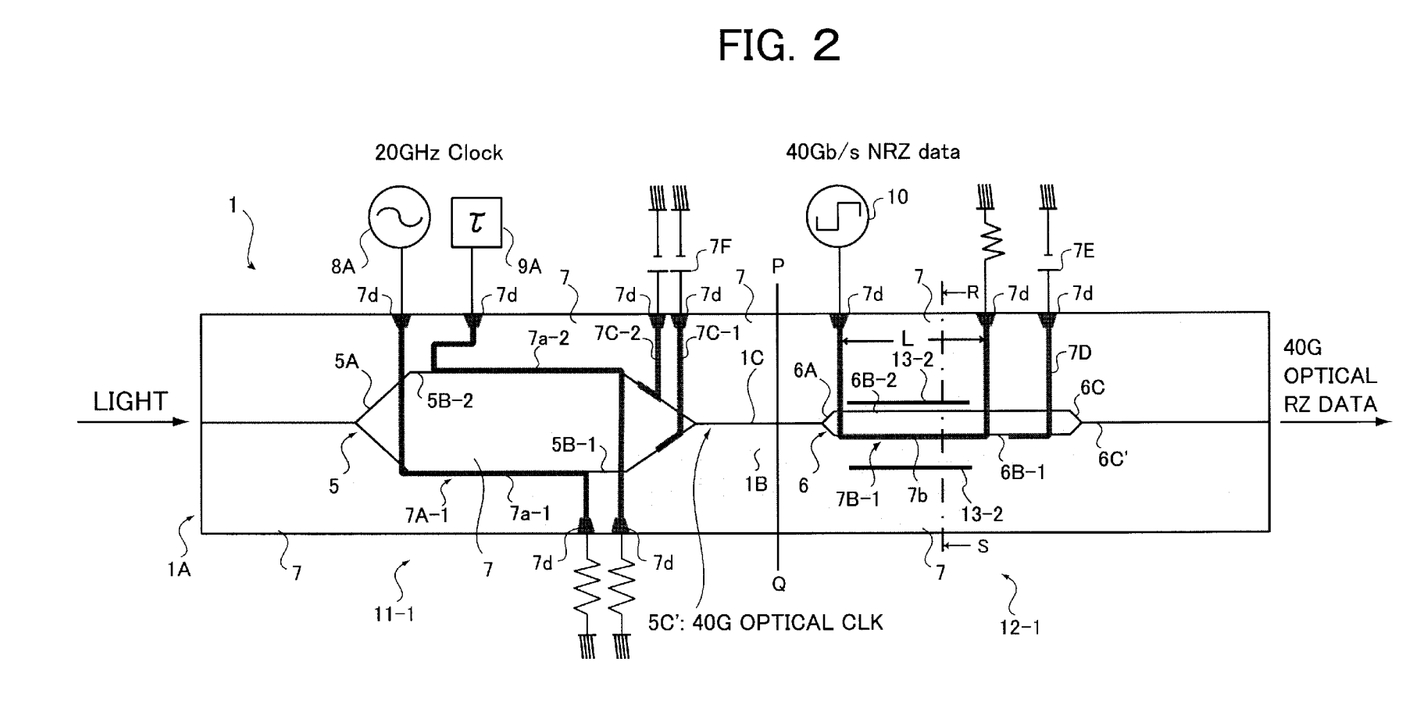
FIG. 2 is a schematic view showing an optical modulator according to a first embodiment of the present invention.

FIG. 2 is a schematic view showing an optical RZ modulator 1 of the clock modulation type to which an optical modulator 12-1 according to a first embodiment of the present invention is applied. Referring to FIG. 2, the optical modulator 1 shown is used, for example, with a transmission side apparatus of a long distance optical transmission system and modulates light from a light source (semiconductor laser) not shown with a transmission data signal. The modulated optical signal is transmitted to the reception side through an optical fiber or the like not shown.

The optical modulator 1 includes a Mach-Zehnder optical modulator 11-1 and another Mach-Zehnder optical modulator 12-1 according to the first embodiment integrated together with each other. The optical modulator 11-1 can modulate light from the light source not shown into an optical RZ clock of, for example, approximately 40 GHz, and the optical modulator 12-1 can modulate the optical RZ clock from the optical modulator 11-1 into an optical RZ data signal of, for example, 40 Gb/s.

Figure 1:
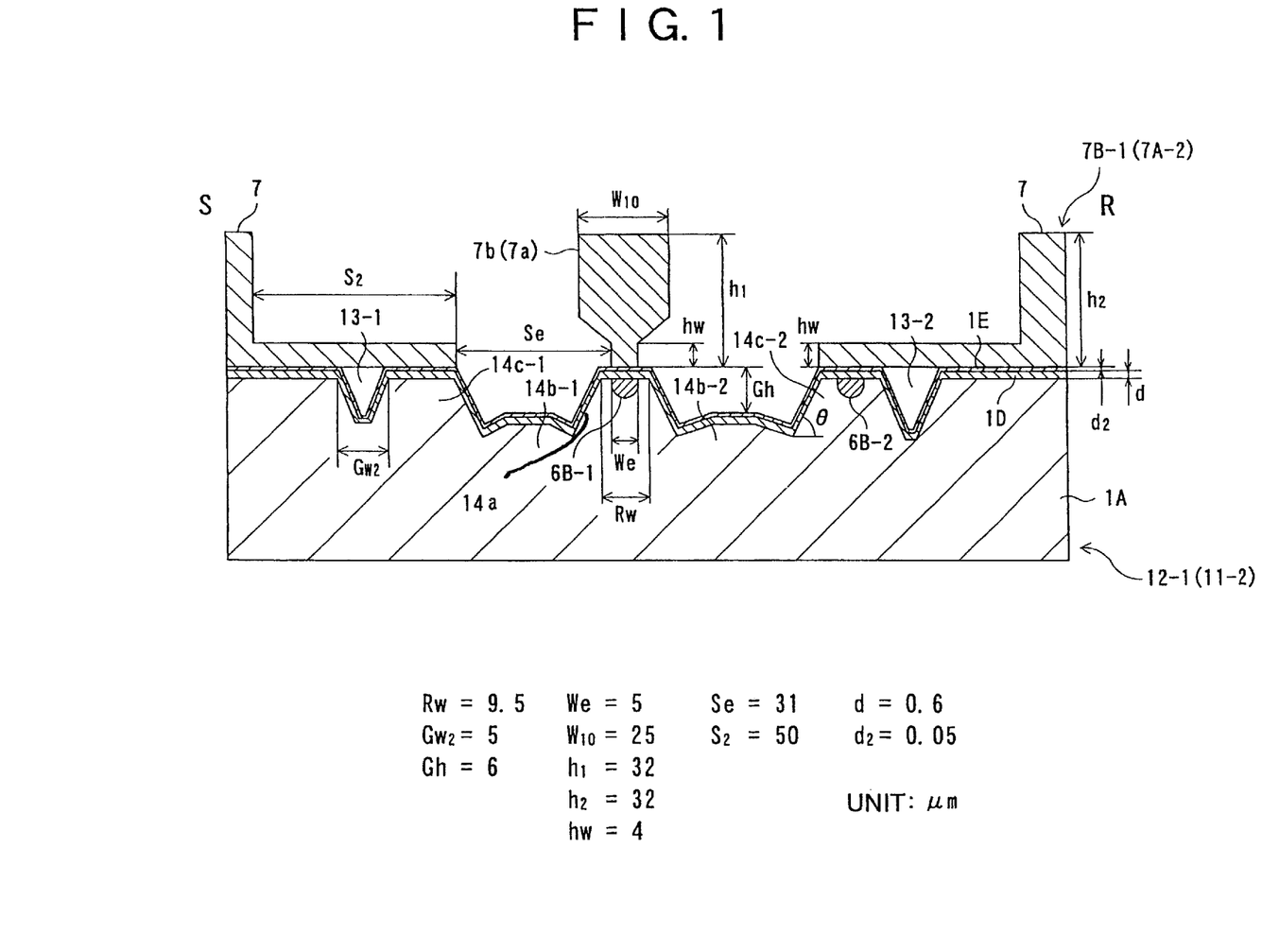
FIG. 1 is a schematic view showing a cross sectional structure of an optical modulator according to several embodiments of the present invention.

FIG. 1 is a sectional view of the optical modulator 12-1 taken along line R-S of FIG. 2. The optical modulator 12-1 shown has characteristic elements of the present invention denoted by reference characters 13-1 and 13-2 in FIGS. 1 and 2. However, an overall structure of the optical modulator 1 is described first, and then the characteristic elements of the present invention are described.

Referring to FIG. 2, the optical modulator 1 includes a Mach-Zehnder first optical waveguide (hereinafter referred to simply as first optical waveguide) 5, a Mach-Zehnder second optical waveguide (hereinafter referred to simply as second optical waveguide) 6, a first electrode 7A-1 and a second electrode 7B-1 formed on a substrate 1A, which is made of lithium niobate (LiNbO₃) and cut in the Z-axis direction of the crystal orientation (Z-axis cut), and integrated together in one chip.

It is to be noted that, while the optical waveguides 5 and 6 and the elements denoted by reference characters 13-1 and 13-2 hereinafter described are covered, at portions thereof which overlap with a grounding electrode 7, with the grounding electrode 7, in order to clearly indicate the arrangement of them, also the portions of them covered with the grounding electrode 7 are indicated by solid lines in FIG. 2.

The first optical waveguide 5 and the second optical waveguide 6 are formed integrally by thermal diffusion of titanium (Ti) or the like so that the second optical waveguide 6 may be in a relationship of cascade connection or series connection to the first optical waveguide 5. Consequently, light from the light source is inputted from the input end of the optical modulator 1 and propagates along the first optical waveguide 5 and the second optical waveguide 6.

The first optical waveguide 5 includes a Y branching waveguide 5A and two straight arm waveguides 5B-1 and 5B-2 on the light incoming side, and a Y branching waveguide 5C on the light outgoing side. Similarly, the second optical waveguide 6 includes a Y branching waveguide 6A and two straight arm waveguides 6B-1 and 6B-2 on the light incoming side, and a Y branching waveguide 6C on the light outgoing side.

In particular, the first optical waveguide 5 is formed on the substrate 1A such that the Y branching waveguide 5A is branched into the two straight arm waveguides 5B-1 and 5B-2 and then the straight arm waveguides 5B-1 and 5B-2 join together at the Y branching waveguide 5C. The second optical waveguide 6 is formed on the substrate 1A such that the Y branching waveguide 6A is branched into the two straight arm waveguides 6B-1 and 6B-2 and then the straight arm waveguides 6B-1 and 6B-2 join together at the Y branching waveguide 5C.

The first electrode 7A-1 is formed as a partial electrode layer on the substrate 1A to control light which propagates in the first optical waveguide 5, and the second electrode 7B-1 is formed as a partial electrode layer on the substrate 1A to control light which propagates in the second optical waveguide 6.

The first electrode 7A-1 includes a dual electrode having two signal electrodes 7a-1 and 7a-2, and grounding electrodes 7. The second electrode 7B-1 includes a signal electrode 7b and the grounding electrodes 7.

The signal electrodes 7a-1 and 7a-2 of the first electrode 7A-1 are formed so as to establish electric connection between two connector contacts at edge portions on the opposite sides of the substrate 1A in its widthwise direction. The signal electrode 7a-1 is formed such that part thereof extends along and above the portion at which the straight arm waveguide 5B-1 of the first optical waveguide 5 is formed, and the signal electrode 7a-2 is formed such that part thereof extends along and above the portion at which the other straight arm waveguide 5B-2 of the first optical waveguide 5 is formed.

The signal electrode 7b formed on the second optical waveguide 6 is formed so as to establish electric connection between two connector contacts at edge portions on one side of the substrate 1A in its widthwise direction. The signal electrode 7b is formed further such that part thereof extends along and above the portion at which the straight arm waveguide 6B-1 of the second optical waveguide 6 is formed.

The grounding electrode 7 is formed as common grounding electrodes for the first electrode 7A-1 and the second electrode 7B-1 such that it is positioned on the opposite sides the signal electrodes 7a-1, 7a-2 and 7b and bias electrodes bias electrode 7C-1, bias electrode 7C-2 and 7D, which are hereinafter described, in a spaced relationship by a predetermined distance to form a coplanar line on the substrate 1A.

A connection pad 7d is formed with a comparatively great width for an electric wiring line and serves as a connector contact for each of the signal electrodes 7a-1, 7a-2 and 7b described above. The bias electrodes bias electrode 7C-1 and bias electrode 7C-2 serve as a dual bias electrode connected to a dc power supply 7F to supply a bias voltage to the first optical waveguide 5 to supplementarily provide an application voltage for clock modulation.

The bias electrode bias electrode 7C-1 is formed such that it extends along and above a branch portion of the Y branching waveguide 5C on the straight arm waveguide 5B-1 side, and the bias electrode bias electrode 7C-2 is formed such that it extends along and above a branch portion of the Y branching waveguide 5C on the straight arm waveguide 5B-2 side. The bias electrode 7D applies a dc voltage from a dc power supply 7E as a single electrode to the second optical waveguide 6 to auxiliary provide an application voltage for NRZ optical modulation and is formed such that it extends along and above the straight arm waveguide 6B-1.

It is to be noted that, also when the modulation characteristic is varied by a temperature variation or the like, the modulation efficiency can be kept optimally by the bias voltages from the bias electrodes bias electrode 7C-1, bias electrode 7C-2 and 7D described above.

Also the bias electrodes bias electrode 7C-1, bias electrode 7C-2 and 7D have a connection pad 7d similarly to the signal electrodes 7a-1, 7a-2 and 7b described above.

A cutaway portion 1B is formed at a connection path 1C between the optical modulator 11-1 and the optical modulator 12-1 such that it cuts away the grounding electrode 7 so that the loss of light which propagates along the connection path 1C may be reduced.

In the optical modulator 1 according to the first embodiment, a buffer layer (refer to reference character 1D of FIG. 2 which is hereinafter described) is interposed between a face of the substrate 1A and the electrode layers, and a silicon (Si) layer (refer to reference character 1E of FIG. 2) is placed on the substrate 1A, more particularly on the buffer layer 1D.

A clock generation drive section 8A generates a sine wave signal of a frequency of, for example, 20 GHz. The sine wave signal of 20 GHz generated is applied through the connection pad 7d to the signal electrode 7a-1 of the dual electrode.

A phase delaying section 9A delays a clock signal from the clock generation drive section 8A by a time ($\tau$) corresponding to a predetermined phase (180 degrees) and converts the voltage of the clock signal. The clock signal of 20 GHz from the phase delaying section 9A is applied through the connection pad 7d to the other signal electrode 7a-2 of the dual electrode.

Consequently, the optical modulator 11-1 composed of the first optical waveguide 5 and the first electrode 7A-1 modulates light from the light source so that an optical clock signal of 40 GHz is propagated on the output side (refer to reference character C' of FIG. 1) of the Y branching waveguide 5C.

In particular, the clock generation drive section 8A and the phase delaying section 9A described above produce, when a clock signal of a frequency (20 GHz) equal to one half the transmission rate (40 Gb/s) per unit time of output light of the optical RZ modulator 1 of the clock modulation type is applied to the first electrode 7A-1, an optical RZ signal of a rate equal to the transmission rate (40 Gb/s) per unit time of the output light of the optical RZ modulator 1 of the clock modulation type.

In other words, light which propagates in the straight arm waveguides 5B-1 and 5B-2 of the first optical waveguide 5 is acted upon by an electro-optical effect of an electric signal as a clock signal applied to the first electrode 7A-1 so that an optical RZ clock of 40 GHz can be produced on the output side 5C' of the Y branching waveguide 5C.

An NRZ data signal generator 10 is connected to the second electrode 7B-1 and supplies an NRZ data signal of, for example, approximately 40 Gb/s to the second electrode 7B-1.

In particular, the optical modulator 12-1 composed of the second optical waveguide 6 and the second electrode 7B-1 can modulate an optical RZ clock of 40 GHz from the first optical waveguide 5 with an NRZ data signal of 40 Gb/s at a timing synchronized with the optical RZ clock so that it can output an optical RZ data signal of 40 Gb/s.

More particularly, light which propagates in the straight arm waveguide 6B-1 of the second optical waveguide 6 is acted upon by an electro-optical effect of an electric signal applied to the second electrode 7B-1 so that an optical RZ data signal of 40 Gb/s is outputted on the output side (refer to reference character 6C' of FIG. 1) of the Y branching waveguide 6C.

FIG. 1 is a sectional view taken along line R-S of the optical modulator 12-1 shown in FIG. 2. Referring to FIG. 1, the substrate 1A has an electro-optical effect as described hereinabove, and is made of lithium niobate (LiNbO$_3$) and cut in the Z-axis direction of the crystal orientation (Z-axis cut).

The substrate 1A has formed thereon a ridge 14a, a first groove 14b-1 and a second groove 14b-2 which are positioned on the opposite sides of the ridge 14a, and a first bank 14c-1 and second bank 14c-2 which are positioned on the outer sides of the first groove 14b-1 and the second groove 14b-2, respectively.

While the first arm waveguide 6B-1 of the second optical waveguide 6 is included in the ridge 14a as hereinafter described, the second arm waveguide 6B-2 of the second optical waveguide 6 is provided at a location of the second bank 14c-2 nearer to the ridge 14a than the recess 13-2 which is hereinafter described.

It is to be noted that, as described hereinabove, the second electrode 7B-1 is formed on the substrate 1A for controlling light propagating in the second optical waveguide 6 and includes the signal electrode 7b and the grounding electrodes 7. The signal electrode 7b is formed on the ridge 14a such that the contact width We thereof with the ridge 14a is smaller than the width Rw of the ridge 14a. The grounding electrodes 7 of the second electrode 7B-1 is formed on the first bank 14c-1 and the second bank 14c-2.

Further, the signal electrode 7b is formed such that it has a height $h_1$, but the width $W_{10}$ of the top face thereof is greater than the contact width We thereof with the ridge 14a. The grounding electrodes 7 formed on the first bank 14c-1 and the second bank 14c-2 is formed with an L-shaped sectional shape taken along line R-S in FIG. 2 such that it has a height $h_2$ at a portion thereof adjacent an end portion of the substrate 1A but has another height hw at a formation face thereof adjacent the ridge 14a. It is to be noted that the signal electrode 7b is formed such that the height of the portion thereof formed with the contact width We is equal to the height hw of the formation face of the grounding electrodes 7 adjacent the ridge 14a.

Here, the ridge 14a is formed with a height Gh such that it extends in parallel to the first arm waveguide 6B-1 including the portion at which the first arm waveguide 6B-1 on which the signal electrode 7b is placed is formed.

The first groove 14b-1 and the second groove 14b-2 are formed by partly removing or digging the substrate 1A to the depth Gh by etching.

The first bank 14c-1 is formed by digging the first groove 14b-1 on the outer side of the first groove 14b-1, i.e., on the outer side in the widthwise direction of the substrate 1A, and the second bank 14c-2 is formed by digging the second groove 14b-2 on the outer side of the second groove 14b-2, i.e., on the outer side in the widthwise direction of the substrate 1A. The top face level of the ridge 14a and the top face levels of the banks 14c-1 and 14c-2 are set substantially in level with each other.

The first bank 14c-1 and the second bank 14c-2 include a first recess 13-1 and a second recess 13-2 as characteristic elements of the present invention, respectively, for reducing the loss in the waveguide and suppressing the loss of a microwave which advances in the signal electrode 7b.

The first recess 13-1 and the second recess 13-2 are set to a depth Gh substantially equal to that of the first groove 14b-1 and the second groove 14b-2 and are formed at symmetrical positions with respect to the ridge 14a in the first bank 14c-1 and the second bank 14c-2, respectively, using etching.

More particularly, the first recess 13-1 and the second recess 13-2 can be formed in a shape of a continuous groove of the width Gw2 such that they may extend in parallel to the first arm waveguide 6B-1 and the second arm waveguide 6B-2 and have a length substantially equal to the length L of the grounding electrodes 7 on the upper face of the second arm waveguide 6B-2 as indicated by broken lines in FIG. 2. In other words, the two recesses 13-1 and 13-2 described above can be formed such that they have a symmetrical relationship with respect to the line of the first arm waveguide 6b-1 which has the signal electrode 7b formed on the upper face thereof.

The grounding electrodes 7 is formed also on the recesses 13-1 and 13-2, and an air gap is formed in each of the recesses 13-1 and 13-2, that is, a region defined by each of the recesses 13-1 and 13-2 and the grounding electrodes 7.

The buffer layer 1D is provided for suppressing the absorption loss of light which propagates in the optical waveguides 5 and 6 and is formed between the electrodes 7A-1 and 7B-1, which form the optical modulators 11-1 and 12-1, respectively, and the substrate 1A.

A silicon layer 1E is formed on the substrate 1A, particularly on the buffer layer 1D. The silicon layer 1E is effective to uniformize electric charge generated by a pyroelectric effect to suppress a variation of the operating point by a temperature variation.

The buffer layer 1D and the silicon layer 1E are provided also in the recesses 13-1 and 13-2 and facilitate adjustment of the characteristic impedance, which should be kept to a fixed value set in advance, and the velocity match between a microwave and light by setting of the thickness of the buffer layer 1D and the silicon layer 1E.

When light from the light source not shown is introduced into the optical modulator 1 of the first embodiment having the configuration described above, while the light propagates in the first optical waveguide 5 which forms the optical modulator 11-1, it can be converted into an optical RZ signal of 40 GHz with a sine wave of 20 GHz by the first electrode 7A-1 to which an RZ signal of a frequency of 20 GHz generated by the clock generation drive section 8A is applied.

Further, while the optical RZ signal propagates in the second optical waveguide 6 which forms the optical modulator 12-1, an NRZ signal of 40 Gb/s generated by the NRZ data signal generator 10 is applied to the second electrode 7B-1 to modulate the optical clock thereby to modulate the optical RZ signal into an optical RZ data signal of 40 Gb/s. The optical RZ data signal is transmitted to the reception side through an optical fiber or the like not shown.

Since the second recess 13-2 is provided on the second bank 14c-2 on which the straight arm waveguide 6B-2 of the second optical waveguide 6 described above is formed, the structure of the portion at which the second arm waveguide 6B-2 is formed can be formed substantially same as the structure of the ridge 14a which has the signal electrode 7b provided on the top portion thereof. Consequently, the losses by the arm waveguides 6B-1 and 6B-2 are substantially equal to each other.

Further, since the first recess 13-1 is provided at the position symmetrical with the second recess 13-2 with respect to the ridge 14a on the first bank 14c-1 on which the two arm waveguides 6B-1 and 6B-2 are not formed as shown in FIG. 1, also the electric field distribution in the substrate 1A by an electric signal provided to the signal electrode 7b can be made symmetrical with respect to the ridge 14a.

In this manner, with the optical modulator 12-1 according to the first embodiment of the present invention, since the first recess 13-1 and the second recess 13-2 are formed at symmetrical positions with respect to the ridge 14a on the first bank 14c-1 and the second bank 14c-2, respectively, also the electric field distribution in the substrate 1A by an electric signal provided to the signal electrode 7b can be made symmetrical with respect to the ridge 14a. Consequently, the optical modulator 12-1 is advantageous in that the loss of a microwave which advances in the signal electrode 7b can be suppressed.

Further, since the provision of the second recess 13-2 makes it possible to form the structure of the portion at which the second arm waveguide 6B-2 is formed substantially same as the structure of the ridge 14a which has the signal electrode 7b formed at the top portion thereof, the optical modulator 12-1 is advantageous also in that the losses by the arm waveguides 6B-1 and 6B-2 can be made substantially equal to each other thereby to suppress the deterioration of the extinction ratio.

Furthermore, since the buffer layer 1D is formed between the face of the substrate 1A and the first electrode 7A-1 and second electrode 7B-1, the optical modulator 12-1 is further advantageous in that the absolution losses of light which propagates in the optical waveguides 5 and 6 can be suppressed and electric charge generated by a pyroelectric effect can be made uniform by the silicon layer 1E formed on the substrate 1A thereby to suppress the variation of the operating point by a temperature variation.

In addition, since the buffer layer 1D and the silicon layer 1E are formed also in the recesses 13-1 and 13-2, the optical modulator 12-1 is advantageous in that adjustment of the characteristic impedance, which should be kept to a fixed value set in advance, and the velocity match between a microwave and light can be performed readily by setting of the thickness of the buffer layer 1D.

b. Second Embodiment

Figure 3:
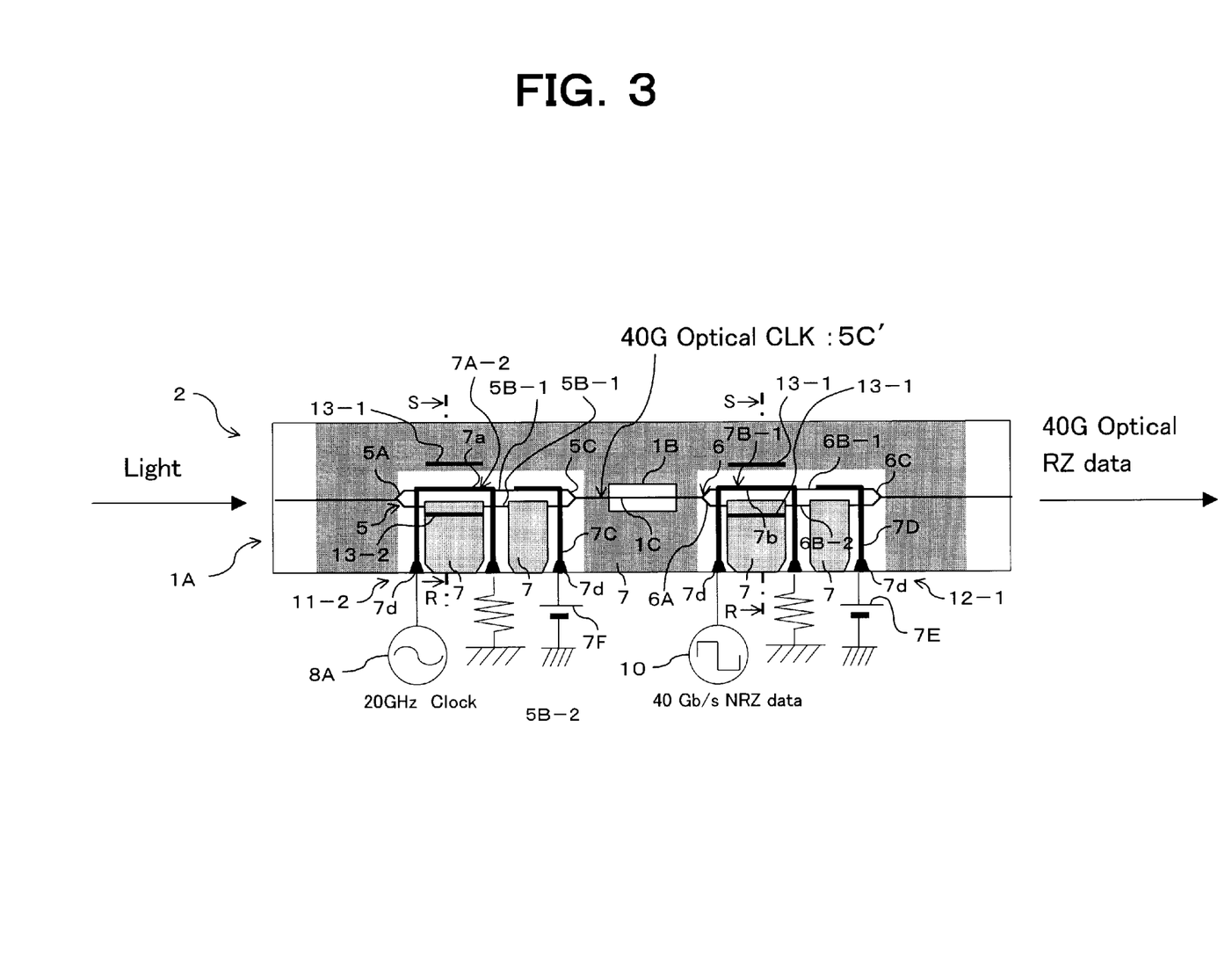
FIG. 3 is a schematic view showing an optical modulator according to a second embodiment of the present invention.

FIG. 3 is a schematic view showing an optical RZ modulator of the clock modulation type to which optical modulators 11-2 and 12-1 according to a second embodiment of the present invention are applied. The optical RZ modulator 2 of the clock modulation type shown in FIG. 3 is common to that of the first embodiment described hereinabove in that two kinds of Mach-Zehnder optical modulators are formed integrally on the substrate 1A made of lithium niobate (LiNbO$_3$) and Z-axis cut, but is different in configuration of the first Mach-Zehnder optical modulator 11-2.

It is to be noted that, in FIG. 3, like reference characters to those of FIG. 2 denote substantially like elements. Thus, the second Mach-Zehnder optical modulator 12-1 is configured in a similar manner to that in the first embodiment described hereinabove.

The first Mach-Zehnder optical modulator 11-2 includes a first electrode 7A-2 and a bias electrode 7C different from those of the first Mach-Zehnder optical modulator 11-1 in the first embodiment, and includes characteristic elements (refer to reference characters 13-1 and 13-2) of the present embodiment similar to those in the Mach-Zehnder optical modulator 12-1.

It is to be noted that, while the optical waveguides 5 and 6 and the elements denoted by reference characters recesses 13-1 and 13-2 hereinafter described are covered, at portions thereof which overlap with the grounding electrodes 7, with the grounding electrodes 7, in order to clearly indicate the arrangement configuration of them, also the portions of them covered with the grounding electrodes 7 are indicated by solid lines in FIG. 3.

In particular, the first electrode 7A-2 includes a single signal electrode 7a and the grounding electrodes 7. The signal electrode 7a is formed so as to establish electric connection between two connector contacts at edge portions of one side of the substrate 1A in its widthwise direction similarly to the signal electrode 7b of the second Mach-Zehnder optical modulator 12-1. The signal electrode 7a is formed further such that part thereof extends along and above the portion at which the straight arm waveguide 5B-1 of the first optical waveguide 5 is formed.

In other words, the first electrode 7A-2 and the second electrode 7B-1 are each formed as a single electrode having the single signal electrode 7a or 7b.

It is to be noted that, since the first electrode 7A-2 and the second electrode 7B-1 in the second embodiment include the single signal electrodes 7a and 7b, respectively, the second embodiment need not include a phase delaying section (reference character 9A of FIG. 1) for applying a clock signal voltage to the dual electrode like the first electrode 7A-1 in the first embodiment.

Further, the bias electrode 7C applies a dc voltage from the dc power supply 7F as a single electrode to the first optical waveguide 5 and is formed such that it extends along and above the straight arm waveguide 5B-1. Also the bias electrode 7C described above includes a connection pad 7d similarly to the bias electrode 7D of the second Mach-Zehnder optical modulator 12-1.

Also the optical modulator 11-2 includes a first recess 13-1 and a second recess 13-2 as characteristic elements of the present invention for reducing the loss by the waveguide and suppressing the loss of a microwave which advances through the signal electrode 7a similarly as in the optical modulator 12-1. In particular, the sectional structure of the optical modulator 11-2 taken along line R-S in FIG. 3 is basically similar to that described hereinabove with reference to FIG. 1 except that the signal electrode 7a is formed on the ridge 14a.

In other words, the optical modulator 2 in the second embodiment is formed from two optical modulators 11-2 and 12-1 respectively having the recesses 13-1 and 13-2, which are characteristic elements of the present invention, and integrated integrally on one chip.

Also in the optical modulator 2 in the second embodiment having the configuration described above, when light from the light source not shown is introduced into it, while the light propagates in the first optical waveguide 5 which forms the optical modulator 11-2, it can be converted into an optical RZ signal of 40 GHz with a sine wave of 20 GHz by the first electrode 7A-2 to which an RZ signal of a frequency of 20 GHz generated by the clock generation drive section 8A is applied.

Further, while the optical RZ signal propagates in the second optical waveguide 6 which forms the optical modulator 12-1, an NRZ signal of 40 Gb/s generated by the NRZ data signal generator 10 is applied to the second electrode 7B-1 to modulate the optical clock thereby to modulate the optical RZ signal into an optical RZ data signal of 40 Gb/s. The optical RZ data signal is transmitted to the reception side through an optical fiber or the like not shown.

Since the second recess 13-2 is provided on the second bank 14c-2 on which the second arm waveguides 5B-2 and 6B-2 of the first optical waveguide 5 and the second optical waveguide 6 described above are formed, the structures of the portions at which the second arm waveguides 5B-2 and 6B-2 are formed can be formed substantially same as the structure of the ridges 14a which has the signal electrodes 7a and 7b provided on the tops thereof. Consequently, the losses by the arm waveguides 5B-1, 5B-2, 6B-1 and 6B-2 are substantially equal to each other.

Further, similarly as in the first embodiment, since the first recess 13-1 is provided at the position symmetrical with the second recess 13-2 with respect to the ridge 14a on the first bank 14c-1 on which the two sets of straight arm waveguides 5B-1, 5B-2 and 6B-1, 6B-2 are not formed, also the electric field distribution in the substrate 1A by electric signals provided to the signal electrodes 7a and 7b can be made symmetrical with respect to the ridge 14a.

In this manner, with the optical modulators 11-2 and 12-1 according to the second embodiment of the present invention, since the first recess 13-1 and the second recess 13-2 are formed at symmetrical positions with respect to the ridge 14a on the first bank 14c-1 and the second bank 14c-2, respectively, also the electric field distribution in the substrate 1A by an electric signal provided to the signal electrode 7b can be made symmetrical with respect to the ridge 14a similarly as in the first embodiment described hereinabove. Consequently, the optical modulators 11-2 and 12-1 are advantageous in that the loss of a microwave which advances in the signal electrodes 7a and 7b can be suppressed.

Further, since the provision of the second recess 13-2 on the optical modulators 11-2 and 12-1 makes it possible to form the structure of the portions at which the second arm waveguides 5b-2 and 6B-2 are formed substantially same as the structure of the ridge 14a which has the signal electrodes 7a and 7b formed on the top thereof, the optical modulators 11-2 and 12-1 are advantageous also in that the losses by the arm waveguides 5B-1, 5B-2, 6B-1 and 6B-2 can be made substantially equal to each other thereby to suppress the deterioration of the extinction ratio.

Furthermore, since the buffer layer 1D is formed between the face of the substrate 1A and the first electrode 7A-2 and second electrode 7B-1, the optical modulators 11-2 and 12-1 are further advantageous in that the absorption losses of light which propagates in the optical waveguides 5 and 6 can be suppressed and electric charge generated by a pyroelectric effect can be made uniform by the silicon layer 1E thereby to suppress the variation of the operating point by a temperature variation.

Besides, since the buffer layer 1D and the silicon layer 1E are formed also in the recesses 13-1 and 13-2, adjustment of the characteristic impedance, which should be kept to a fixed value set in advance, and the velocity match between a microwave and light can be performed readily by setting of the thickness of the buffer layer 1D and the silicon layer 1E.

c. Third Embodiment

Figure 4:
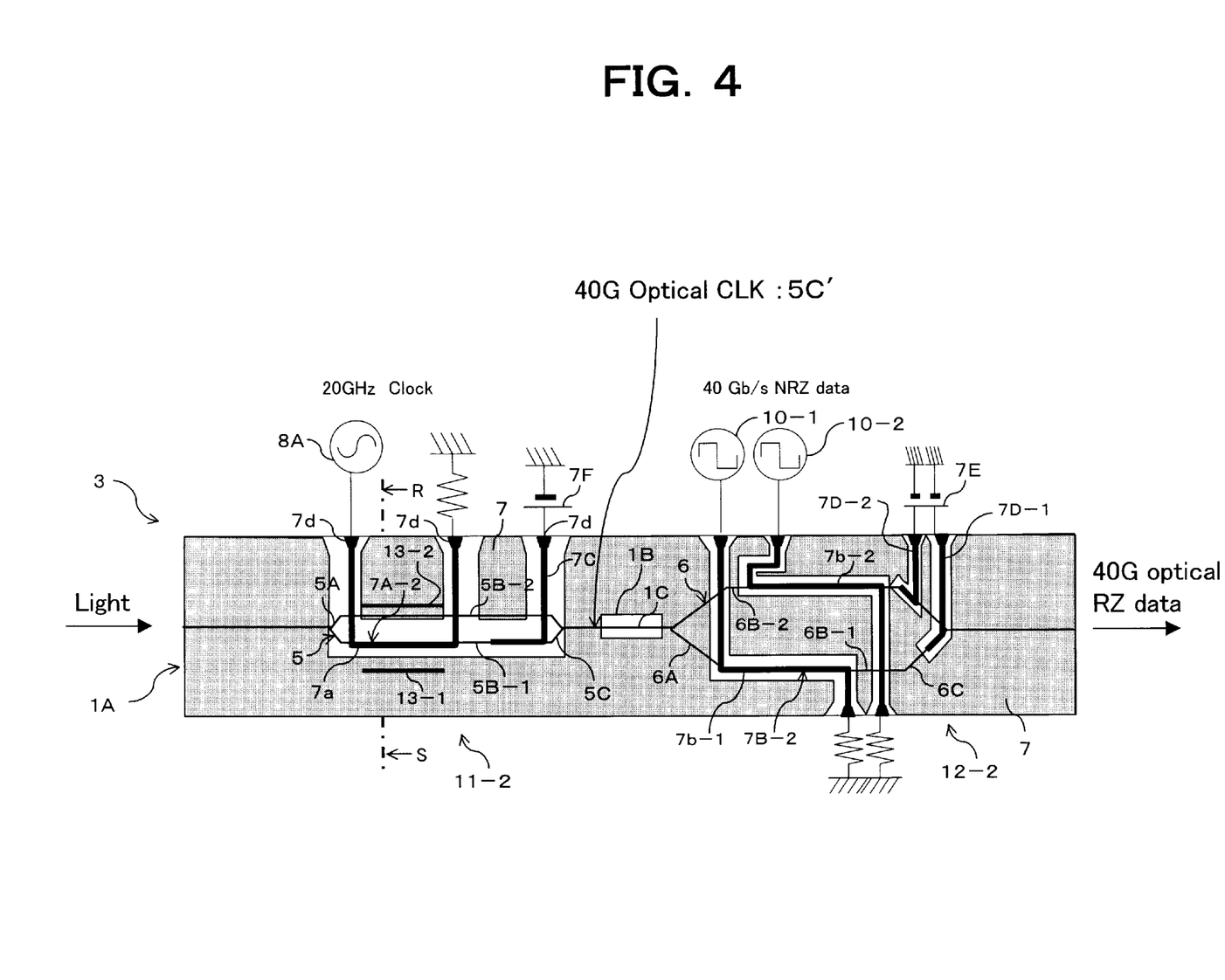
FIG. 4 is a schematic view showing an optical modulator according to a third embodiment of the present invention.

FIG. 4 is a schematic view showing an optical RZ modulator of the clock modulation type to which an optical modulator 11-2 according to a third embodiment of the present invention is applied. Also the optical RZ modulator 3 of the clock modulation type shown in FIG. 4 is common to those of the first and second embodiments described hereinabove in that two kinds of Mach-Zehnder optical modulators are formed integrally on the substrate 1A made of lithium niobate (LiNbO$_3$) and Z-axis cut, but is different in configuration of a second Mach-Zehnder optical modulator 12-2.

It is to be noted that, in FIG. 4, like reference characters to those of FIG. 3 denote substantially like elements. Thus, the first Mach-Zehnder optical modulator 11-2 having recesses 13-1 and 13-2 which are characteristic elements of the present invention is configured in a similar manner to that in the second embodiment described hereinabove.

It is to be noted that, similarly as in the first and second embodiments described above, the optical waveguides 5 and 6 and the elements denoted by reference characters 13-1 and 13-2 which are hereinafter described are indicated, at portions thereof which are covered with grounding electrodes 7, by solid lines in FIG. 4.

The second Mach-Zehnder optical modulator 12-2 includes a second electrode 7B-2 and bias electrodes 7D-1 and 7D-2 different from those of the second Mach-Zehnder optical modulator 12-1 in the first and second embodiments, but does not include recesses as characteristic elements of the present invention.

The second electrode 7B-2 is formed on the substrate 1A for controlling light which propagates in the second optical waveguide 6 and includes a dual electrode having two signal electrodes 7b-1 and 7b-2 and grounding electrodes 7.

The signal electrodes 7b-1 and 7b-2 are formed so as to establish electric connection between two connector contacts at edge portions of the opposite sides of the substrate 1A in its widthwise direction. The signal electrode 7b-1 is formed such that part thereof extends along and above the portion at which the straight arm waveguide 6B-1 of the second optical waveguide 6 is formed. The signal electrode 7b-2 is formed such that part thereof extends along and above the portion at which the other straight arm waveguide 6B-2 of the second optical waveguide 6 is formed.

In other words, of the first electrode 7A-2 and the second electrode 7B-2 described above, the second electrode 7B-2 is formed as a dual electrode having two signal electrodes while the first electrode 7A-2 is formed as a single electrode having a single signal electrode.

Further, NRZ data signal generators 10-1 and 10-2 are connected to the signal electrodes 7b-1 and 7b-2 of the second electrode 7B-1 and supply NRZ data signals of a bit rate corresponding to an optical clock to the second electrode 7B-2.

The NRZ data signal generators 10-1 and 10-2 generate same NRZ data signals having phases displaced by 180 degrees from each other. The NRZ data signal voltage from the NRZ data generator 10-1 is applied to the signal electrode 7*b*-1, and the NRZ data signal voltage from the NRZ data generator 10-2 is applied to the signal electrode 7*b*-2.

It is to be noted that, in FIG. 4, the NRZ data signal generators 10-1 and 10-2 are shown such that they generate data signals of 40 Gb/s.

Also in the optical modulator 3 of the third embodiment having the configuration described above, when light from the light source not shown is introduced into it, while the light propagates in the first optical waveguide 5 which forms the optical modulator 11-2, it can be converted into an optical RZ signal of 40 GHz with a sine wave of 20 GHz by the first electrode 7A-2 to which an RZ signal of a frequency of 20 GHz generated by the clock generation drive section 8A is applied.

Further, while the optical RZ signal propagates in the second optical waveguide 6 which forms the optical modulator 12-2, NRZ signals of 40 Gb/s generated by the NRZ data signal generators 10-1 and 10-2 are applied to the signal electrodes 7*b*-1 and 7*b*-2 of the second electrode 7B-1, respectively, to modulate the optical clock thereby to modulate the optical RZ signal into an optical RZ data signal of 40 Gb/s. The optical RZ data signal is transmitted to the reception side through an optical fiber or the like not shown.

Since the second recess 13-2 is provided on the second bank 14*c*-2 on which the second arm waveguide 5B-2 of the first optical waveguide 5 described above is formed, the structure of the portion at which the second arm waveguide 5B-2 is formed can be formed substantially same as the structure of the ridge 14*a* which has the signal electrode 7*a* provided on the top portion thereof. Consequently, the losses by the arm waveguides 5B-1 and 5B-2 are substantially equal to each other.

Further, similarly as in the second embodiment, since the first recess 13-1 is provided at the position symmetrical with the second recess 13-2 with respect to the ridge 14*a* on the first bank 14*c*-1 on which the arm waveguides 5B-1 and 5B-2 are not formed, also the electric field distribution in the substrate 1A by electric signals provided to the signal electrodes 7*a* and 7*b* can be made symmetrical with respect to the ridge 14*a*.

In this manner, also with the optical modulator 3 according to the third embodiment of the present invention, since the optical modulator 11-2 is formed integrally and the first recess 13-1 and the second recess 13-2 are formed at symmetrical positions with respect to the ridge 14*a* on the first bank 14*c*-1 and the second bank 14*c*-2, respectively, similar advantages to those of the first embodiment described hereinabove can be achieved.

Further, since the buffer layer 1D is formed between the face of the substrate 1A and the first electrode 7A-2 and second electrode 7B-2, the optical modulator 3 is further advantageous in that the absorption losses of light which propagates in the optical waveguides 5 and 6 can be suppressed and electric charge generated by a pyroelectric effect can be made uniform by the silicon layer 1E thereby to suppress the variation of the operating point by a temperature variation.

Besides, since the buffer layer 1D and the silicon layer 1E are formed also in the recesses 13-1 and 13-2, adjustment of the characteristic impedance, which should be kept to a fixed value set in advance, and the velocity match between a microwave and light can be performed readily by setting of the thickness of the buffer layer 1D and the silicon layer 1E.

d. Fourth Embodiment

In the first to third embodiments described in detail above, an optical modulator having the recesses 13-1 and 13-2 which are characteristic elements of the present invention is applied to an optical RZ modulator of the clock modulation type. However, according to the present invention, it is naturally possible, for example, to form an optical modulator as a single drive optical modulator 12 of a single unit having a basically similar configuration to that of the optical modulators 11-2 and 12-1 of the first to third embodiments described herein above, as shown in FIG. 5

In particular, the optical modulator 12 according to the fourth embodiment can be used as a single drive modulator which performs NRZ data modulation of light from a light source similarly to the optical modulator 20 described hereinabove with reference to FIG. 8. However, the optical modulator 12 is different from the optical modulator 20 in that it has recesses 13-1 and 13-2 which are characteristic elements of the present invention.

Figure 5:
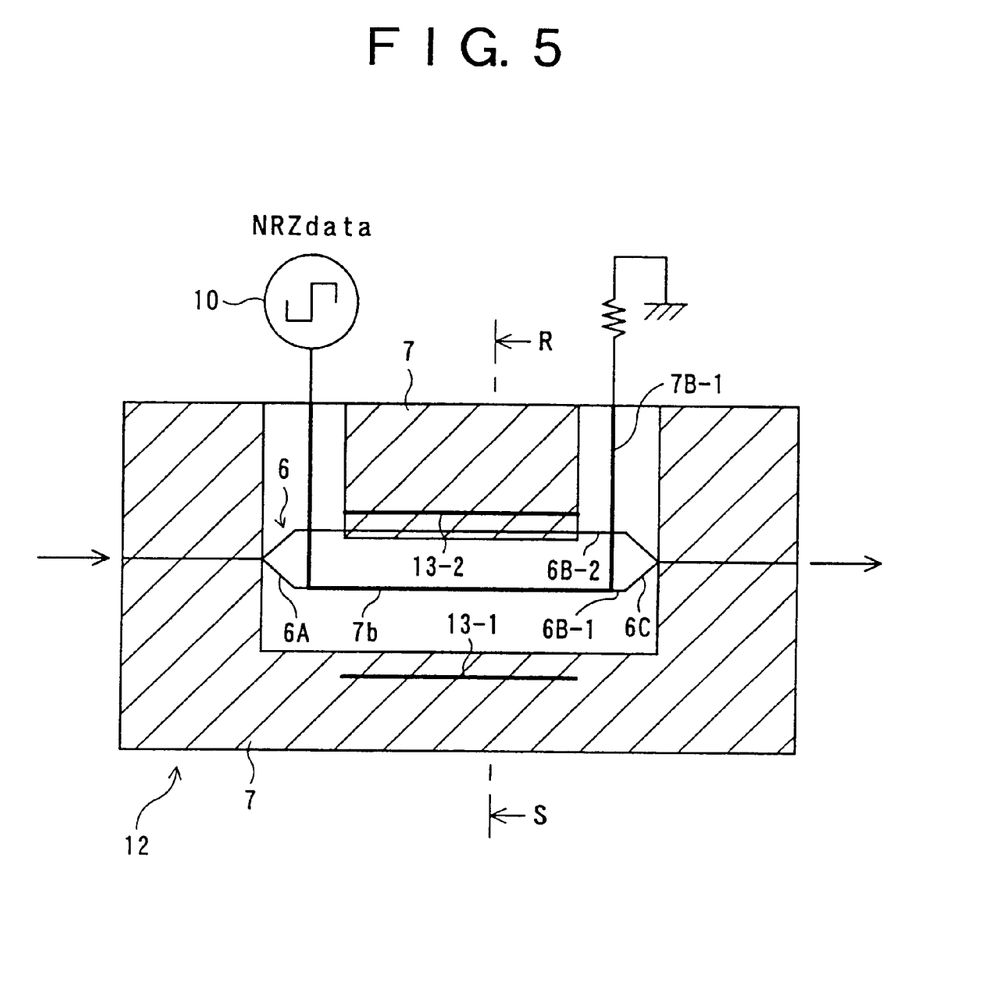
FIG. 5 is a schematic view showing an optical modulator according to a fourth embodiment of the present invention.

It is to be noted that, similarly as in the first and second embodiments described above, the optical waveguide 6 and the elements denoted by reference characters 13-1 and 13-2 are indicated, at portions thereof which are covered with a grounding electrode 7, by solid lines in FIG. 5.

Also in the optical modulator 12 according to the fourth embodiment, similarly as in the optical modulators 11-2 and 12-1 in the embodiments described hereinabove, the sectional structure taken along line R-S of FIG. 5 is configured basically similarly to that described hereinabove with reference to FIG. 1. Consequently, the optical modulator 12 can reduce the loss of the waveguide and suppress the loss of a microwave which advances in the signal electrode 7*b*. It is to be noted that, in FIG. 4, like reference characters similar to those of FIG. 1 denote substantially like elements.

In the single drive optical modulator 12 having the configuration described above with reference to FIG. 4, when light from the light source not shown is introduced into it, while the light propagates in the Mach-Zehnder optical waveguide, it is modulated into an NRZ optical signal by the signal electrode 7*b* to which a voltage signal of NRZ data or the like is applied. The NRZ optical signal is outputted from the single drive optical modulator 12.

Since the second recess 13-2 is provided on the second bank 14*c*-2 on which the second arm waveguide 6B-2 of the optical waveguide 6 described above is formed, the structure of the portion at which the second arm waveguide 6B-2 is formed can be formed substantially same as the structure of the ridge 14*a* which has the signal electrode 7*b* provided at the top portion thereof. Consequently, the losses by the straight arm waveguides 6B-1 and 6B-2 are substantially equal to each other.

Further, since the first recess 13-1 is provided at the position symmetrical with the second recess 13-2 with respect to the ridge 14*a* on the first bank 14*c*-1 on which the two arm waveguides 6B-1 and 6B-2 are not formed, also the electric field distribution in the substrate 1A by an electric signal provided to the signal electrode 7*b* can be made symmetrical with respect to the ridge 14*a*.

In this manner, also with the optical modulator according to the fourth embodiment, similar advantages to those of the first to third embodiments described hereinabove can be achieved.

e. Others

Figure 6:
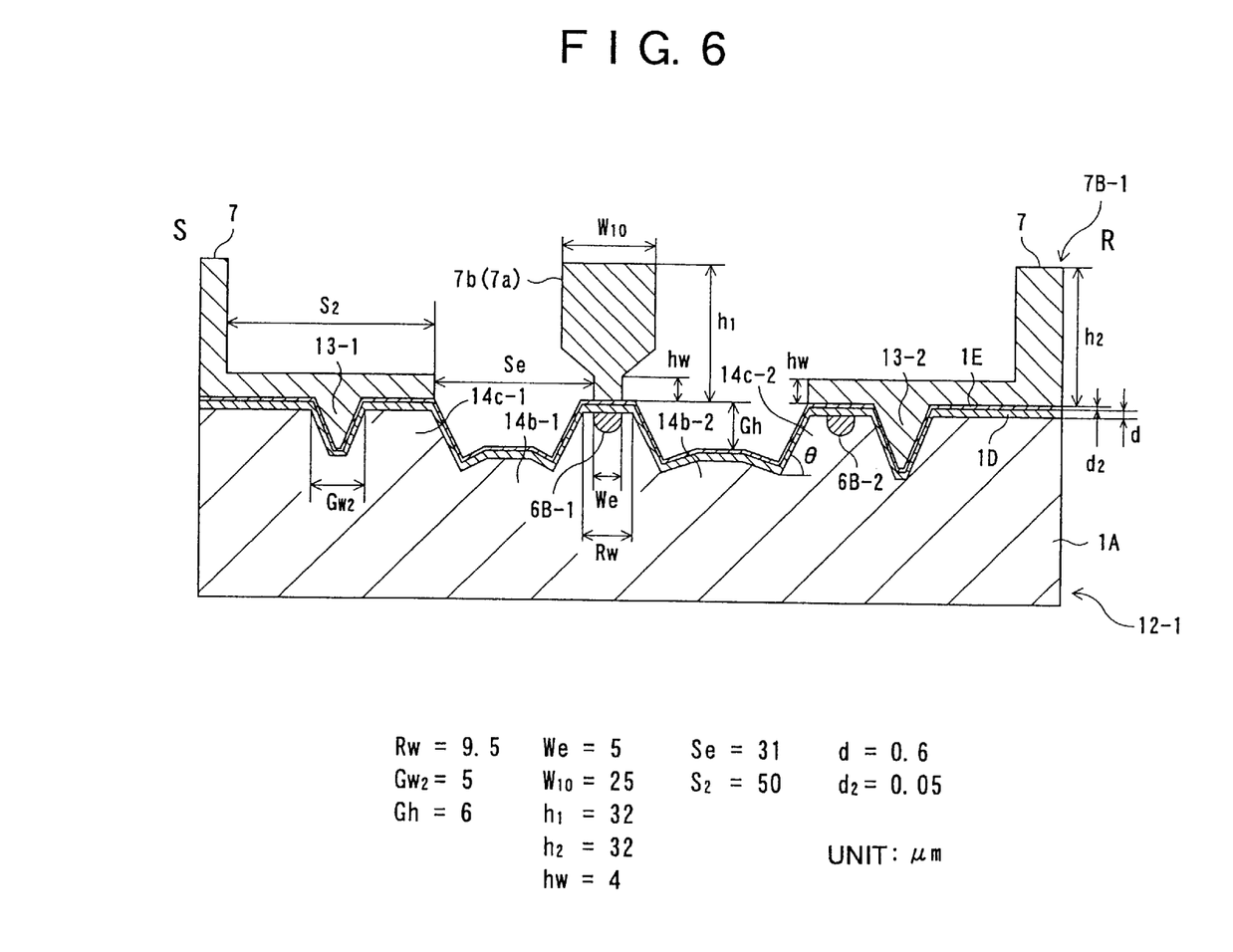
FIGS. 6 and 7 are schematic views showing optical modulators according to different modifications to the embodiments.

It is to be noted that, while, in the optical modulators of the embodiments described hereinabove, an air gap is formed in each of the recesses 13-1 and 13-2, that is, in a region defined by each of the recesses 13-1 and 13-2 and the grounding electrode 7, the optical modulator according to the present invention is not limited to the specific configuration and may otherwise be configured such that, for example, as shown in FIG. 6, a grounding electrode 7 is provided above each of the first recess 13-1 and the second recess 13-2 and part of the grounding electrode 7 is filled in each of the first recess 13-1 and the second recess 13-2.

Figure 7:
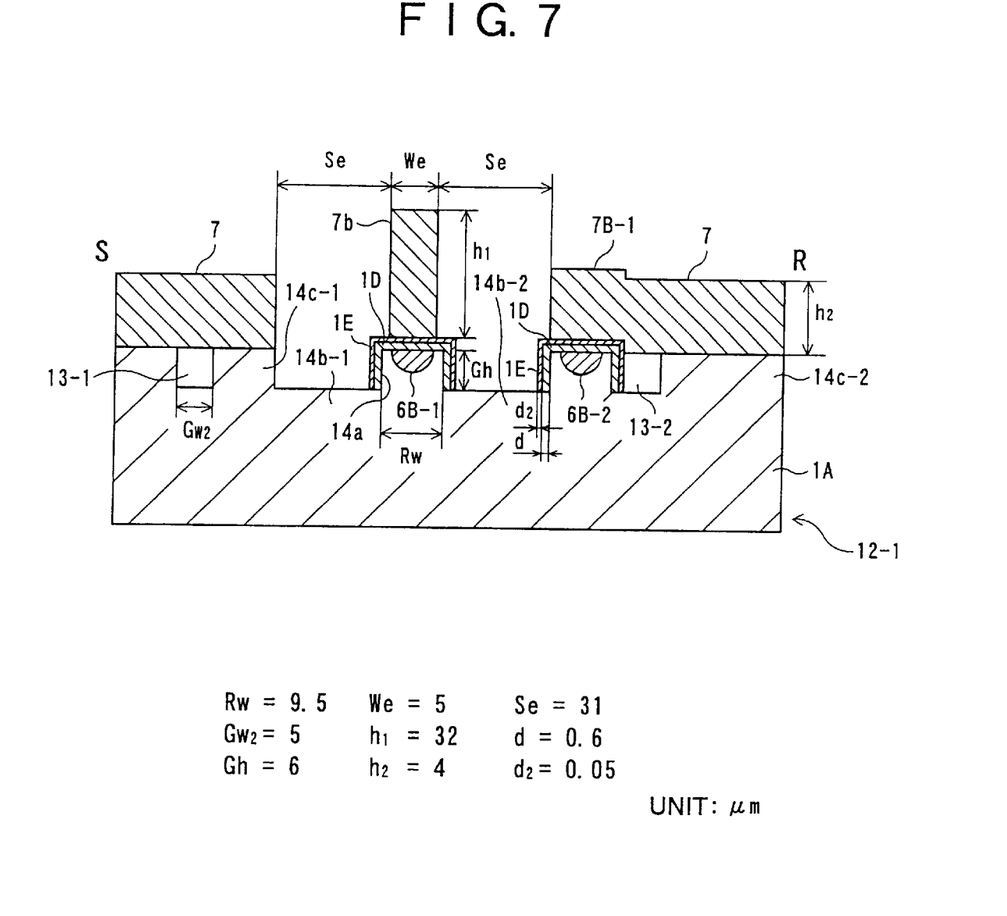

Further, while, in the embodiments described above, the buffer layer 1D is formed between the substrate 1A and the first electrode 7A-1 and second electrode 7B-1 and the silicon layer 1E is formed on the buffer layer 1D over the overall area of the substrate 1A (refer to FIG. 1), according to the present invention, it is otherwise possible to configure the optical modulator such that, for example, as shown in a cross sectional view of FIG. 7 taken along line R-S, a buffer layer 1D' and a silicon layer 1E are formed between at least the portions of the substrate 1A on which the optical waveguides 5 and 6 are formed and the first electrode 7A-1 and second electrode 7B-1. Also where the optical modulator is configured in this manner, at least the absorption losses of light which propagates in the optical waveguides 5 and 6 can be suppressed.

Further, while the modulators of the embodiments described above in which the recesses 13-1 and 13-2 are provided are shown such that the width of the first arm waveguides 5B-1 and 6B-1 is substantially equal to the contact width of the signal electrode 7b with the ridge 14a, according to the present invention, the relationship of the width Rw of the ridge 14a, the waveguide width and the contact width We between the signal electrode 7b and the ridge 14a can be varied within a range within which the balance among the demand for suppression of the waveguide loss, the demand for lowering of the drive voltage and the demand for the velocity match between microwave and light can be maintained taking the electrode distance Se and the electrode thickness into consideration.

Furthermore, while the recesses 13-1 and 13-2 are each formed in a shape of a continuous groove such that they extend in parallel to the first arm waveguides 5B-1 and 6B-1 and the second arm waveguides 5B-2 and 6B-2 and have a length substantially equal to the length L of the grounding electrode 7 on the upper faces of the second arm waveguide 5B-2 and 6B-2, similar advantages to those which can be achieved by the embodiments described hereinabove can be achieved even where the optical modulator is formed such that the length of the continuous groove shape of the recesses 13-1 and 13-2 is varied or each of the recesses 13-1 and 13-2 has a shape of an intermittent groove.

Further, while the optical modulates of the embodiments described above can modulate a data signal into an optical signal having an information amount of 40 Gb/s, the present invention can be applied to another optical modulator for modulation into an optical signal having an information amount smaller than 40 Gb/s or a further optical modulator for modulation into an optical signal having an information amount greater than 40 Gb/s.

The present invention is not limited to the embodiments specifically described above, and variations and modifications can be made without departing from the scope of the present invention.

What is claimed is:

1. An optical modulator, comprising:
   a substrate having an electro-optical effect and having formed thereon a ridge, first and second grooves which are positioned on the opposite sides of said ridge, and first and second banks which are positioned on the outer sides of said first and second grooves, respectively;
   a Mach-Zehnder optical waveguide formed on said substrate and including a first Y branching waveguide, first and second arm waveguides which are branched from said first Y branching waveguide and one of which is included in said ridge, and a second Y branching waveguide at which said first and second arm waveguides join together;
   an electrode formed on said substrate and including a signal electrode formed on said ridge and two grounding electrodes formed on said first and second banks for controlling light propagating in said optical waveguide; and
   first and second recesses formed at symmetrical positions with respect to said ridge on said first and second banks, respectively.

2. An optical modulator as claimed in claim 1, wherein said substrate is made of $LiNbO_3$.

3. An optical modulator as claimed in claim 2, wherein said substrate made of $LiNbO_3$ is a Z-axis cut substrate.

4. An optical modulator as claimed in claim 1, wherein said ridge and said first and second banks have top faces which are set in a substantially same level with one another.

5. An optical modulator as claimed in claim 4, wherein said first and second recesses have a depth set substantially equal to the depth of said first and second grooves.

6. An optical modulator as claimed in claim 1, wherein a buffer layer is formed between said substrate and said electrode.

7. An optical modulator as claimed in claim 6, wherein said buffer layer is provided also in said first and second recesses.

8. An optical modulator as claimed in claim 1, wherein a silicon layer is placed on said substrate.

9. An optical modulator as claimed in claim 8, wherein said silicon layer is provided also in said first and second recesses.

10. An optical modulator as claimed in claim 1, wherein said grounding electrodes are provided on said first and second recesses and an air gap is formed in each of said first and second recesses.

11. An optical modulator as claimed in claim 1, wherein said grounding electrodes are provided on said first and second recesses and part of said grounding electrodes is filled in said first and second recesses.

12. An optical modulator as claimed in claim 1, wherein said signal electrode contacts with said ridge with a width smaller than the width of said ridge.

13. An optical modulator as claimed in claim 1, wherein the other one of said first and second arm waveguides is provided at a location of one of said first and second banks nearer to said ridge than a corresponding one of said first and second recesses.

14. An optical modulator, comprising:
   a Z-axis cut substrate made of $LiNbO_3$ and having formed thereon a ridge, first and second grooves which are positioned on the opposite sides of said ridge, and first and second banks which are positioned on the outer sides of said first and second grooves, respectively;
   a Mach-Zehnder optical waveguide formed on said substrate and including a first Y branching waveguide, first and second arm waveguides which are branched from said first Y branching waveguide and one of which is included in said ridge, and a second Y branching waveguide at which said first and second arm waveguides join together;
   an electrode formed on said substrate and including a signal electrode formed on said ridge and two grounding electrodes formed on said first and second banks, for controlling light propagating in said optical waveguide;

a buffer layer formed between said substrate and said electrode;

a silicon layer placed on said substrate; and first and second recesses formed at symmetrical positions with respect to said ridge on said first and second banks, respectively.

15. An optical modulator as claimed in claim 14, wherein said buffer layer is provided also in said first and second recesses.

16. An optical modulator as claimed in claim 14, wherein said silicon layer is provided also in said first and second recesses.

17. An optical modulator as claimed in claim 14, wherein the other one of said first and second arm waveguides is provided at a location of one of said first and second banks nearer to said ridge than a corresponding one of said first and second recesses.

18. An optical modulator comprising:

a ridge with first and second grooves positioned on opposite sides of the ridge;

first and second banks positioned on outer sides of the first and second grooves, respectively;

first and second recesses in the first and second banks, respectively, the first and second recesses formed at symmetrical positions with respect to the ridge; and a Mach-Zehnder optical waveguide including a first Y branching waveguide, first and second arm waveguides branching from the first Y branching waveguide, and a second Y branching waveguide at which the first and second arm waveguides join together, one of the first and second arm waveguides, but not the other of the first and second arm waveguides, being on the ridge.

19. An optical modulator as in claim 18, further comprising:

a substrate having an electro-optical effect, wherein the ridge, the first and second grooves, the first and second banks, the first and second recesses and the Mach-Zehnder optical waveguide are formed on the substrate.

20. An optical modulator as in claim 19, wherein the substrate is made of LiNbO$_3$.

21. An optical modulator as in claim 19, wherein the substrate is a z-cut substrate made of LiNbO$_3$.

22. An optical modulator as in claim 19, further comprising first and second grounding electrodes on the first and second banks, respectively.

23. An optical modulator as in claim 19, further comprising first and second grounding electrodes on the first and second banks, respectively, wherein at least part of the first and second grounding electrodes are filled in the first and second recesses, respectively.

24. An optical modulator as in claim 19, wherein the ridge and the first and second banks have top faces which are set in a substantially same level with each other.

25. An optical modulator as in claim 19, wherein the first and second recesses and the first and second grooves each have a substantially same depth.

26. An optical modulator as in claim 19, further comprising a signal electrode on the ridge, the signal electrode contacting the ridge with a width smaller than a width of the ridge.

27. An optical modulator as in claim 19, further comprising:

a signal electrode on the ridge;

first and second grounding electrodes on the first and second banks, respectively; and a buffer layer between the substrate and each of the first grounding electrode, the second grounding electrode and the signal electrode.

28. An optical modulator as in claim 18, wherein said other of the first and second arm waveguides is provided on one of the first and second banks and at a position nearer to the ridge than the respective recess of the first and second recesses which is in said one of the first and second banks.

29. An optical modulator comprising:

a ridge with first and second grooves positioned on opposite sides of the ridge;

first and second banks positioned on outer sides of the first and second grooves, respectively;

first and second recesses in the first and second banks, respectively, the first and second recesses formed at symmetrical positions with respect to the ridge;

a Mach-Zehnder optical waveguide including a first Y branching waveguide, first and second arm waveguides branching from the first Y branching waveguide, and a second Y branching waveguide at which the first and second arm waveguides join together, one of the first and second arm waveguides, but not the other of the first and second arm waveguides, being on the ridge; and a z-cut LiNbO$_3$ substrate having an electro-optical effect, wherein the ridge, the first and second grooves, the first and second banks, the first and second recesses and the Mach-Zehnder optical waveguide are formed on the substrate.

30. An optical modulator as in claim 29, further comprising first and second grounding electrodes on the first and second banks, respectively.

31. An optical modulator as in claim 29, further comprising first and second grounding electrodes on the first and second banks, respectively, wherein at least part of the first and second grounding electrodes are filled in the first and second recesses, respectively.

32. An optical modulator as in claim 29, wherein the ridge and the first and second banks have top faces which are set in a substantially same level with each other.

33. An optical modulator as in claim 29, wherein the first and second recesses and the first and second grooves each have a substantially same depth.

34. An optical modulator as in claim 29, further comprising a signal electrode on the ridge, the signal electrode contacting the ridge with a width smaller than a width of the ridge.

35. An optical modulator as in claim 29, further comprising:

a signal electrode on the ridge;

first and second grounding electrodes on the first and second banks, respectively; and a buffer layer between the substrate and each of the first grounding electrode, the second grounding electrode and the signal electrode.

36. An optical modulator as in claim 29, wherein said other of the first and second arm waveguides is provided on one of the first and second banks and at a position nearer to the ridge than the respective recess of the first and second recesses which is in said one of the first and second banks.

37. An optical modulator comprising:

a ridge with first and second grooves positioned on opposite sides of the ridge;

first and second banks positioned on outer sides of the first and second grooves, respectively;

first and second recesses in the first and second banks, respectively, the first and second recesses formed at symmetrical positions with respect to the ridge;

a Mach-Zehnder optical waveguide including a first Y branching waveguide, first and second arm waveguides branching from the first Y branching waveguide, and a second Y branching waveguide at which the first and second arm waveguides join together, one of the first and second arm waveguides, but not the other of the first and second arm waveguides, being on the ridge;

a signal electrode on the ridge;

first and second grounding electrodes on the first and second banks, respectively; and a z-cut $LiNbO_3$ substrate having an electro-optical effect, wherein the ridge, the first and second grooves, the first and second banks, the first and second recesses, the Mach-Zehnder optical waveguide, the signal electrode, and the first and second grounding electrodes are formed on the substrate.

38. An optical modulator as in claim 37, wherein at least part of the first and second grounding electrodes are filled in the first and second recesses, respectively.

39. An optical modulator as in claim 37, wherein the ridge and the first and second banks have top faces which are set in a substantially same level with each other.

40. An optical modulator as in claim 37, wherein the first and second recesses and the first and second grooves each have a substantially same depth.

41. An optical modulator as in claim 37, wherein the signal electrode contacts the ridge with a width smaller than a width of the ridge.

42. An optical modulator as in claim 37, further comprising:

a buffer layer formed on the substrate, the buffer layer being between the substrate and each of the first grounding electrode, the second grounding electrode and the signal electrode.

43. An optical modulator as in claim 37, wherein said other of the first and second arm waveguides is provided on one of the first and second banks and at a position nearer to the ridge than the respective recess of the first and second recesses which is in said one of the first and second banks.

* * * * *